United States Patent [19]
Yamaha

[11] 3,894,371
[45] July 15, 1975

[54] VEHICLE WINDOW ASSEMBLY
[75] Inventor: Kazuo Yamaha, Tokyo, Japan
[73] Assignee: Nissan Motor Company Limited, Yokohama, Japan
[22] Filed: Mar. 8, 1974
[21] Appl. No.: 449,532

[30] Foreign Application Priority Data
Mar. 9, 1973 Japan.................................. 48-28649

[52] U.S. Cl. ......................... 52/209; 49/476; 52/97
[51] Int. Cl. ............................................... E06b 7/14
[58] Field of Search ............... 52/209, 97, 302–304; 49/476

[56] References Cited
UNITED STATES PATENTS
1,703,230  2/1929  Gillar ..................................... 52/209
2,922,675  1/1960  Wernig ................................. 52/209

Primary Examiner—J. Karl Bell

[57] ABSTRACT

A weatherstrip has a drain passageway around the edge of the window, which is vented at the top. Water drains out of the passageway through drain holes through the bottom of the weatherstrip and the window frame.

1 Claim, 4 Drawing Figures

VEHICLE WINDOW ASSEMBLY

The present invention relates to a motor vehicle body having a window assembly with an improved water drainage system.

A weatherstrip is widely employed to mount a window pane in a window frame of a motor vehicle. The weatherstrip is attached to the window frame by engagement of an outer retaining groove thereof with a flange extending radially inward from the frame and has a lip with a face sealingly contacting outer surfaces of outer body panels adjacent to and radially outward of the window frame. The window pane is installed by inserting its edge portion into an inner retaining groove formed in the weatherstrip. Practically, the outer panel surfaces in sealing contact with the lip and the window pane surfaces in sealing contact with the inner retaining groove are not smooth enough to seal completely, and thus entry of rain water is hardly avoidable with this weatherstrip. More specifically, rain water may collect in an upper clearance between the frame and the weatherstrip and/or in the inner retaining groove, and the collected water will enter the interior of the motor vehicle due to capillary action.

To reduce the entry of rain water, it has been proposed to drain water collected in the inner retaining groove of the weatherstrip through drain holes formed through the bottom wall of the weatherstrip leading externally from the window frame. One such prior art assembly incorporating this proposal has drain holes located in alignment with drain holes formed through the window frame. With this prior art assembly, it was found by experiment that a degree of vacuum is created within the inner retaining groove, preventing drainage of the water collected in the groove. Accordingly, the present invention aims at eliminating the above mentioned shortcoming encountered in the prior art.

It is an object of the present invention to provide a window and frame assembly for a motor vehicle in which collected water is effectively drained therefrom.

The above and other objects, features and advantages of the present invention will become apparent from the following description with reference to the accompanying drawing, wherein.

Figures 1, 2:
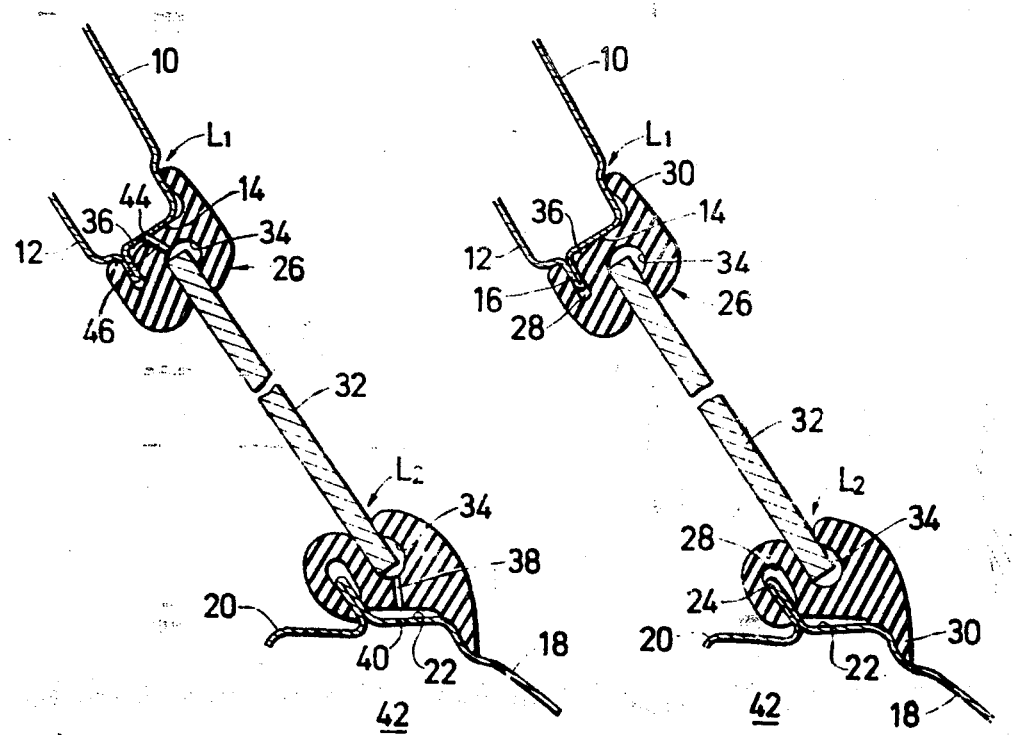
FIG. 1 is a sectional view of a front windshield assembly of an automobile, illustrating a preferred embodiment of the present invention.
FIG. 2 is a similar view to FIG. 1, but illustrating a prior art assembly.
Figure 4:
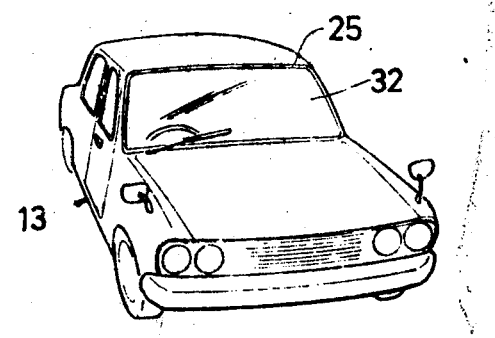
FIG. 4 is a perspective iveiw of a motor vehicle body comprising a window assembly according to the invention.

Referring to FIG. 2 and FIG. 4, an outer roof panel 10 and an inner roof panel 12 of a vehicle body 13 are bent toward and joined with each other to provide an upper window frame portion 14 and an upper flange portion 16. An outer body panel 18 and an inner body panel 20 are similarly joined to provide a lower window frame portion 22 and a lower flange portion 24. The upper and lower frame portions 14 and 22 are joined together at both ends with side frame portions of front end pillars to provide a closed loop window frame 25, and the upper and lower flanges 16 and 24 are joined with side flanges to provide a mounting flange for a weatherstrip 26. The weatherstrip 26, which is in the form of a closed loop, is attached to the window frame 25 by engagement of an outer retaining groove 28 with the mounting flange portions 16 and 24, and has a lip 30 sealingly contacting the outer surfaces of the outer roof and body panels 10 and 18 respectively as will readily be understood from the drawings. A windshield pane 32 is installed by inserting its edge portion into an inner retaining groove 34 of the weatherstrip 26. With this prior art arrangement, for the aforesaid reason, rain water may enter a clearance 36 through between the lip 30 and the exterior surface of the outer roof panel 10 (indicated by an arrow $L_1$) and the inner retaining groove 34 through between the exterior surface of the window pane 32 and the lower portion of the weatherstrip 26 (indicated by an arrow $L_2$), and will enter the interior of the vehicle body 13 due to capillary action.

Figure 3:
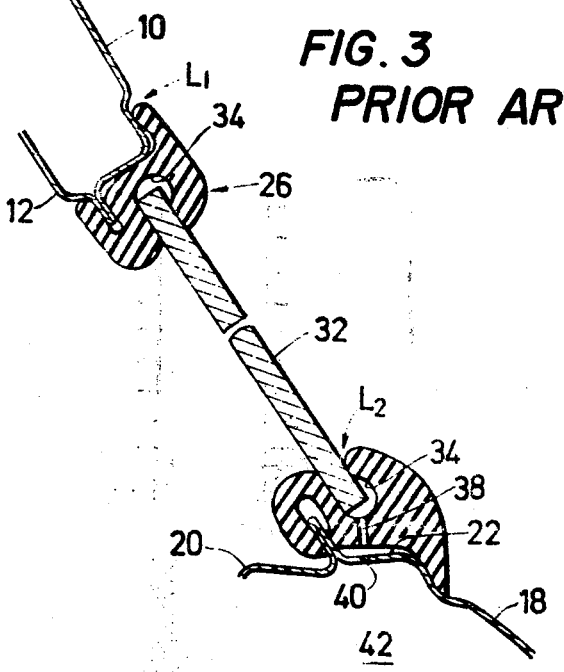
FIG. 3 is similar to FIG. 1, illustrating a prior art assembly incorporating a conventional drain hole arrangement.

FIG. 3 illustrates an improved prior art arrangement devised to reduce the entry of rain water, in which water collected in the inner retaining groove 34, which have acts as a drain passageway, is drained through drain holes 38, only one of which is shown, and through drain holes 40, one being shown, into an engine compartment 42. With this prior art arrangement, drainage of water collected in the inner retaining groove 34 is not facilitated because a degree of vacuum is created within the inner retaining groove 34. It will also be noted that with this prior art arrangement, water entering clearance space 36 via $L_1$ will not be drained.

Referring now to FIG. 1, the same reference numerals as in FIGS. 2, 3 and 4 are employed to designate corresponding parts. The upper frame portion 14 is formed with at least one air vent hole 44 communicating with the interior of the automobile body and the lower frame portion 22 is formed with at least one drain hole 40 communicating with the engine compartment 42. The weatherstrip 26 is mounted within the window frame 25 in the same manner as in FIGS. 2 or 3. The weatherstrip 26 has formed therethrough an air vent hole 46 located in alignment with the air vent hole 44 so that it connects the vent hole 44 with the groove 34. Similarly to FIG. 3, the weatherstrip 26 shown in FIG. 1 has drain holes 38 located in alignment with the drain holes 40 so that the groove 34 is connected to the holes 40 therethrough, the windshield 32 is conventionally installed as illustrated in the drawings. Preferably, the hole 46 is located at the uppermost position at the center of the inner retaining groove 34, and the drain holes 38 at lowermost positions at the right and left sides of the lower portion of the groove 34, and at the uppermost position at the center of the lower portion of the groove 34. The air vent hole 46 location and the drain hole 38 locations should be determined so that they will align with the corresponding holes in the window frame 25.

The drain passageway or groove 34 will be explained hereinafter. Rain water collected in the clearance 36 can be drained through the hole 46 into the inner groove 34 and down along the periphery of the windshield 32 through the drain holes 38 and the drain holes 40 into the engine compartment 42. On the other hand, water collected in the groove 34 will be drained through the drain holes 38 and the drain holes 40 into the engine compartment 42. With the air vent hole 44 and the air vent hole 46, the pressure in the inner retaining groove 34 will be atmospheric, and vacuum that would prevent drainage will not be created in the inner retaining groove 34, and drainage through the inner retaining groove 34 will be facilitated. It is also to be appreciated that drainage of water collected in the gap 36 will be facilitated also, because the water may be drained through the hole 46.

What is claimed is:

1. In a vehicle having a passenger compartment and an engine compartment, a vehicle body having a window frame defining a window opening, an exterior surface exposed outward of the vehicle and terminating in at and merging into said window frame, and flange structure projecting inwardly from said frame with respect to said window opening, said frame having a plurality of air vent apertures formed therethrough at upper portions thereof and opening to the passenger compartment and having a plurality of drain apertures formed therethrough at lower portions thereof and opening to the engine compartment;

a window pane; and a weatherstrip sealingly mounted to said flange structure and having a lip sealingly engaging said exterior surface, said weatherstrip being formed with oppositely opening channel means for receiving an edge of said window panel sealingly to provide a continuous drain passageway around said window pane, with a plurality of first holes therethrough aligning with said air vent apertures and opening to said drain passageway, and with a plurality of second holes alining with said drain apertures and opening to said drain passageway, said first and second holes being constructed and arranged such that water entering a space between upper portion of said window frame and upper portion of said weatherstrip is drained through said first hole, said drain passageway and said drain apertures and air in the passenger compartment is allowed to enter said drain passageway through said air vent apertures and said first holes.

* * * * *